(12) United States Patent
Okabe et al.

(10) Patent No.: US 10,141,560 B2
(45) Date of Patent: Nov. 27, 2018

(54) ENERGY STORAGE DEVICE INCLUDING A PRESSING MEMBER PRESSING A SEPARATOR TOWARD AN ELECTRODE ASSEMBLY

(71) Applicant: GS Yuasa International Ltd., Kyoto-shi (JP)

(72) Inventors: Kazuya Okabe, Kyoto (JP); Yudai Kato, Ritto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 260 days.

(21) Appl. No.: 15/071,044

(22) Filed: Mar. 15, 2016

(65) Prior Publication Data

US 2016/0276704 A1  Sep. 22, 2016

(30) Foreign Application Priority Data

Mar. 20, 2015 (JP) ................. 2015-058256

(51) Int. Cl.
| | |
|---|---|
| *H01M 2/22* | (2006.01) |
| *H01M 2/26* | (2006.01) |
| *H01M 10/0587* | (2010.01) |
| *H01M 10/04* | (2006.01) |
| *H01M 10/052* | (2010.01) |

(52) U.S. Cl.
CPC ............ *H01M 2/263* (2013.01); *H01M 2/22* (2013.01); *H01M 10/0431* (2013.01); *H01M 10/052* (2013.01); *H01M 10/0587* (2013.01); *H01M 2220/20* (2013.01); *Y02E 60/122* (2013.01); *Y02P 70/54* (2015.11)

(58) Field of Classification Search
CPC ................................ H01M 2/263; H01M 2/22
USPC ............................. 429/94, 161, 180, 233, 247
See application file for complete search history.

(56) References Cited

U.S. PATENT DOCUMENTS

| | | |
|---|---|---|
| 2005/0058908 A1 | 3/2005 | Imachi et al. |
| 2005/0287431 A1 | 12/2005 | Cho |
| 2008/0078815 A1 | 4/2008 | Taniguchi et al. |
| 2010/0081050 A1 | 4/2010 | Taniguchi et al. |

(Continued)

FOREIGN PATENT DOCUMENTS

| | | |
|---|---|---|
| JP | 2002-100340 A | 4/2002 |
| JP | 2005-093242 A | 4/2005 |

(Continued)

OTHER PUBLICATIONS

Ariga Toshiyuki, Machine Translation of JP 2014-238941 A, Dec. 2014 (Year: 2014).*

*Primary Examiner* — Sean P Cullen
(74) *Attorney, Agent, or Firm* — McGinn I. P. Law Group, PLLC.

(57) ABSTRACT

Provided is an energy storage device which includes an electrode assembly in which electrode plates are stacked; and a current collector connected to an end portion of the electrode assembly, wherein the end portion of the electrode assembly includes: an electrode plate welded portion at which the stacked electrode plates are welded to each other in a stacking direction and not joined to the current collector; and a current collector joined portion which is joined to the current collector and is arranged adjacently to the electrode plate welded portion in a current collector extending direction that intersects with the stacking direction.

11 Claims, 9 Drawing Sheets

(56) References Cited

U.S. PATENT DOCUMENTS

| | | | | |
|---|---|---|---|---|
| 2010/0279160 | A1* | 11/2010 | Lee .................. | H01M 2/263 |
| | | | | 429/94 |
| 2010/0279170 | A1* | 11/2010 | Lee .................. | H01M 2/263 |
| | | | | 429/178 |
| 2011/0311851 | A1* | 12/2011 | Shinoda ............ | H01M 2/263 |
| | | | | 429/94 |
| 2013/0084479 | A1* | 4/2013 | Nonaka ............ | H01M 10/0431 |
| | | | | 429/94 |

FOREIGN PATENT DOCUMENTS

| | | | |
|---|---|---|---|
| JP | 2006-012830 | A | 1/2006 |
| JP | 2007-053002 | A | 3/2007 |
| JP | 2008-084755 | A | 4/2008 |
| JP | 2010-086780 | A | 4/2010 |
| JP | 2014-060045 | A | 4/2014 |
| JP | 2014-216194 | A | 11/2014 |
| JP | 2014238941 | A * | 12/2014 |
| JP | 2015-088247 | A | 5/2015 |

* cited by examiner

ENERGY STORAGE DEVICE INCLUDING A PRESSING MEMBER PRESSING A SEPARATOR TOWARD AN ELECTRODE ASSEMBLY

CROSS-REFERENCE TO RELATED APPLICATIONS

This application claims the benefit of Japanese patent application No. 2015-058256, filed on Mar. 20, 2015, which is incorporated by reference.

FIELD

The present invention relates to an energy storage device which includes an electrode assembly and a current collector connected to the electrode assembly.

BACKGROUND

Conventionally, an energy storage device such as a lithium ion secondary battery is used as a power source for an electric vehicle (EV), a plug-in hybrid electric vehicle (PHEV), a hybrid electric vehicle (HEV) and the like. Such an energy storage device includes, in general, an electrode assembly, a current collector connected to the electrode assembly.

The electrode assembly which the energy storage device includes is formed by winding an element where a positive electrode plate and a negative electrode plate are arranged in a layered manner with a separator interposed therebetween, for example. When a conductive foreign substance such as a metal piece or metal powder, for example, intrudes into the electrode assembly having such a structure in which the positive electrode plate and the negative electrode plate are disposed in an opposedly facing manner, there is a possibility that a defect such as a minute short-circuiting occurs.

JP-A-2007-53002 discloses a method of manufacturing a battery having a structure in which electrode sheets of an electrode unit overlap with each other, and the electrode sheets projecting from the overlapping portion and current collector terminals are joined to each other by ultrasonic welding. According to this manufacturing method, by applying a compressive force to the overlapping portion of electrode sheets at the time of performing ultrasonic welding, it is possible to prevent metal powder generated during ultrasonic welding from intruding into the overlapping portion.

A conductive foreign substance such as a metal piece or metal powder in the inside of the energy storage device is generated in a manufacturing step such as welding between an electrode assembly and a current collector. However, the case where a conductive foreign substance is generated is not limited to such a case, and there may also be a case where a conductive foreign substance is generated due to an impact or the like applied to the energy storage device during the use of the energy storage device, for example.

Accordingly, even in the case where a foreign substance is generated in the inside of the energy storage device 10 due to an external factor after the manufacture of the energy storage device 10, it is important to prevent such a foreign substance from intruding (moving) into the inside of the electrode assembly for suppressing the occurrence of a defect.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide a highly reliable energy storage device.

An energy storage device according to an aspect of the present invention includes an electrode assembly in which electrode plates are stacked; and a current collector connected to end portion of the electrode assembly, wherein the end portion of the electrode assembly includes: (a) an electrode plate welded portion at which the stacked electrode plates are welded to each other in a stacking direction and not joined to the current collector; and (b) a current collector joined portion which is joined to the current collector and is arranged adjacently to the electrode plate welded portion in a current collector extending direction that intersects with the stacking direction.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
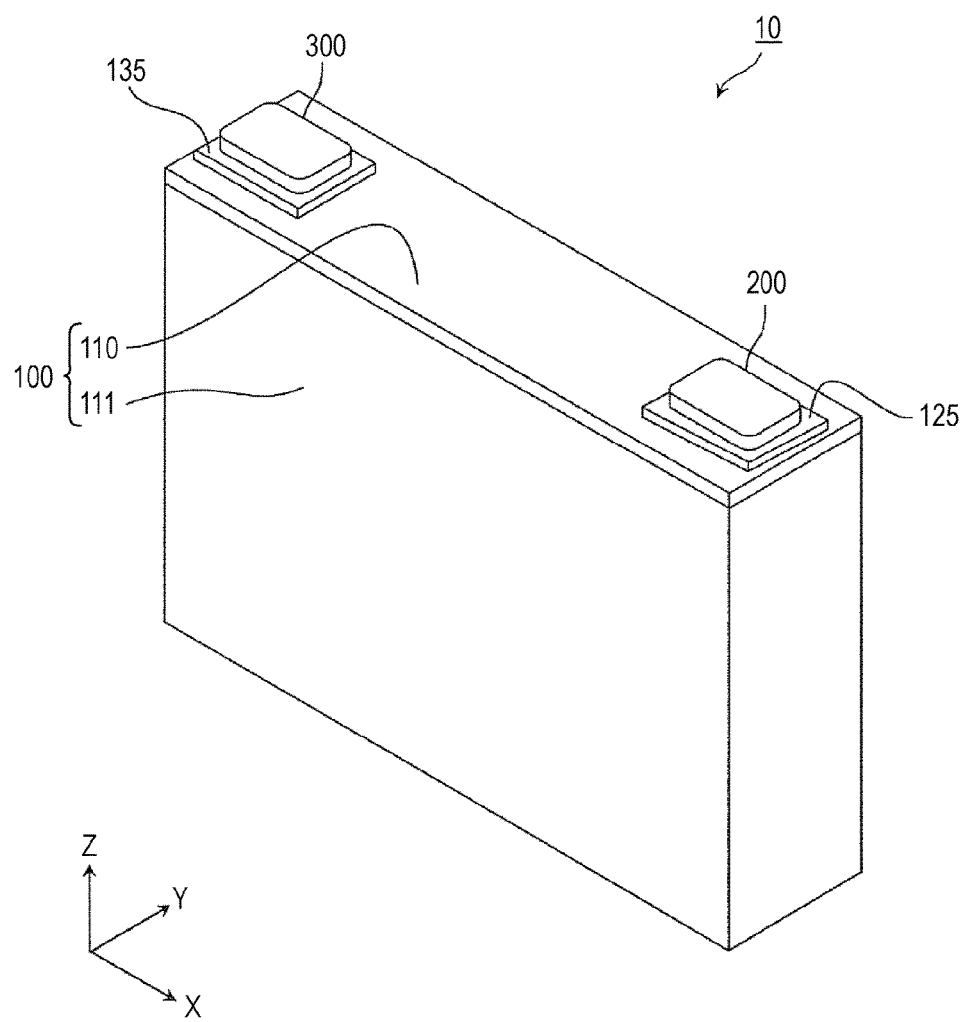
FIG. 1 is a perspective view showing an external appearance of an energy storage device according to an embodiment.

According to an aspect of the present invention, there is provided an energy storage device including an electrode assembly in which electrode plates are stacked; and a current collector connected to end portion of the electrode assembly, wherein the end portion of the electrode assembly includes: (a) an electrode plate welded portion at which the stacked electrode plates are welded to each other in a stacking direction and not joined to the current collector; and (b) a current collector joined portion which is joined to the current collector and is arranged adjacently to the electrode plate welded portion in a current collector extending direction that intersects with the stacking direction.

With such a configuration, the electrode plate welded portion is formed on a portion of the end portion of the electrode assembly, and the current collector joined portion is formed on another portion of the end portion of the electrode assembly. In other words, the electrode plates are welded to each other also at the portion of the end portion of the electrode assembly other than the portion of the end portion of the electrode assembly which is joined to the current collector and hence, an amount of gap formed between the electrode plates at the end portion can be reduced. As a result, for example, the intrusion of a foreign substance such as metal powder from the end portion of the electrode assembly can be suppressed.

The current collector joined portion at the end portion of the electrode assembly is arranged at a position where the current collector joined portion is arranged adjacently to the electrode plate welded portion in a current collector extending direction that intersects with the stacking direction. That is, a portion of the end portion of the electrode assembly to which an operation such as applying vibrations or applying heat for welding is not applied and the current collector are joined to each other using a technique such as ultrasonic welding. With such a configuration, for example, quality of joining between the end portion of the electrode assembly and the current collector is guaranteed. Thus, a highly reliable energy storage device can be provided.

In the energy storage device, the electrode assembly may be a winding-type electrode assembly that includes a pair of oppositely facing flat portions and curved portions connecting the flat portions, the electrode plate welded portion may be formed in the flat portions such that the stacked electrode plates are welded to each other, the current collector joined portion may be formed in the flat portions such that the stacked electrode plates are joined to the current collector, and the end portion of the electrode assembly may further have non-welded portions formed in the curved portions at which the stacked electrode plates are not welded to each other.

With such a configuration, the electrode plate welded portion and the current collector joined portion are formed on the end portions of the pair of flat portions of the winding-type electrode assembly. Accordingly, for example, the intrusion of a foreign substance into the inside of the electrode assembly from the end portion of the winding-type electrode assembly can be suppressed. Further, the non-welded portion is formed on the curved portion of the electrode assembly and hence, for example, it is possible to ensure a path for infiltration of an electrolyte solution into the electrode assembly.

In the energy storage device, the electrode plate welded portion may be a portion of the pair of flat portions where the stacked electrode plates are collectively welded to each other, and the current collector joined portion may be a portion of the pair of flat portions where the stacked electrode plates are collectively welded to the current collector.

With such a configuration, the electrode plate welded portion and the current collector joined portion are formed so as to close the end portions of the pair of flat portions of the winding-type electrode assembly. Accordingly, for example, it is possible to bring about a state where an opening of a space about a winding axis (winding axis space) which exists in the winding-type electrode assembly is substantially closed. That is, a portion of the winding-type electrode assembly usually having a relatively large opening is brought into a closed state and hence, an effect of suppressing the intrusion of a foreign substance into the inside of the electrode assembly can be further enhanced.

In the energy storage device, the electrode plate welded portion may be formed by welding the stacked electrode plates by ultrasonic welding, and the end portion of the electrode assembly and the current collector may be joined to each other by ultrasonic welding at the current collector joined portion.

With such a configuration, both the electrode plate welded portion and the current collector joined portion are formed using ultrasonic waves and hence, for example, the same facility can be used both in forming the electrode plate welded portion and in forming the current collector joined portion. Further, both the electrode plate welded portion and the current collector joined portion can be formed within a short time and with certainty.

In the energy storage device, the electrode assembly may further include a separator disposed on an outermost side of the electrode assembly, and the energy storage device may further include a pressing member that presses an edge portion of the separator close to the end portion of the electrode assembly in a direction toward the inside of the electrode assembly.

With such a configuration, for example, a gap which is not closed by the electrode plate welded portion and the current collector joined portion and formed inside the separator on an outermost periphery of the electrode assembly is closed by the pressing member. Accordingly, the occurrence of a defect caused by a foreign substance which intrudes into the inside of the electrode assembly can be suppressed with greater certainty.

In the energy storage device, the pressing member may be (i) a tape which is adhered so as to straddle a boundary between an edge portion and the electrode plate disposed inside the separator or (ii) a spacer which is mounted on a current collector side of the electrode assembly and has projecting portions which press the end edge portion of the separator.

With such a configuration, the pressing member can be realized by an object having a simple structure such as the tape or the spacer. That is, an effect of suppressing the intrusion of a foreign substance into the inside of the electrode assembly can be enhanced by the simple structure.

An energy storage device according to another aspect of the present invention includes: an electrode assembly in which electrode plates are stacked; and a current collector connected to an end portion of the electrode assembly, wherein the energy storage device further includes a tape adhered to straddle a boundary between an edge portion of a separator and an electrode plate disposed inside the separator, the separator being disposed on an outermost side of the electrode assembly.

With such a configuration, a gap formed between the edge portion of the separator on an outermost side of the electrode assembly and the electrode plate disposed inside the separator is closed by the tape and hence, the intrusion of a foreign substance such as metal powder from the gap can be suppressed. Accordingly, a highly reliable energy storage device can be provided.

According to the aspects of the present invention, it is possible to provide a highly reliable energy storage device.

Hereinafter, an energy storage device according to an embodiment of the present invention is described with reference to drawings. The respective drawings are schematic views, and the energy storage device is not always described with strict accuracy.

The embodiment and modifications of the embodiment described hereinafter are comprehensive examples or specific examples. In the embodiment and the modifications described hereinafter, numerical values, shapes, materials, constitutional elements, arrangement positions and connection states of the constitutional elements and the like are merely examples, and these are not intended to be used for limiting the present invention. Further, out of the constitutional elements in the embodiment and the modifications described hereinafter, the constitutional elements which are not described in independent claims describing an uppermost concept are described as arbitrary constitutional elements.

In the description made hereinafter and the drawings, a direction of a winding axis of an electrode assembly of the energy storage device is defined as an X axis direction. That is, the X axis direction can be defined as a direction along which current collectors or electrode terminals are arranged, or a direction along which short side surfaces of a container opposedly face each other. A vertical direction of the energy storage device is defined as a Z axis direction. That is, the Z axis direction can be defined as a direction along which connecting plate portions of the current collectors extend or a longitudinal direction of the short side surfaces of the container. Further, a direction which intersects with the X axis direction and the Z axis direction is defined as a Y axis direction. That is, the Y axis direction can be defined as a direction along which long side surfaces of the container opposedly face each other, a lateral direction of the short side surfaces of the container, or a thickness direction of the container.

Figure 2:
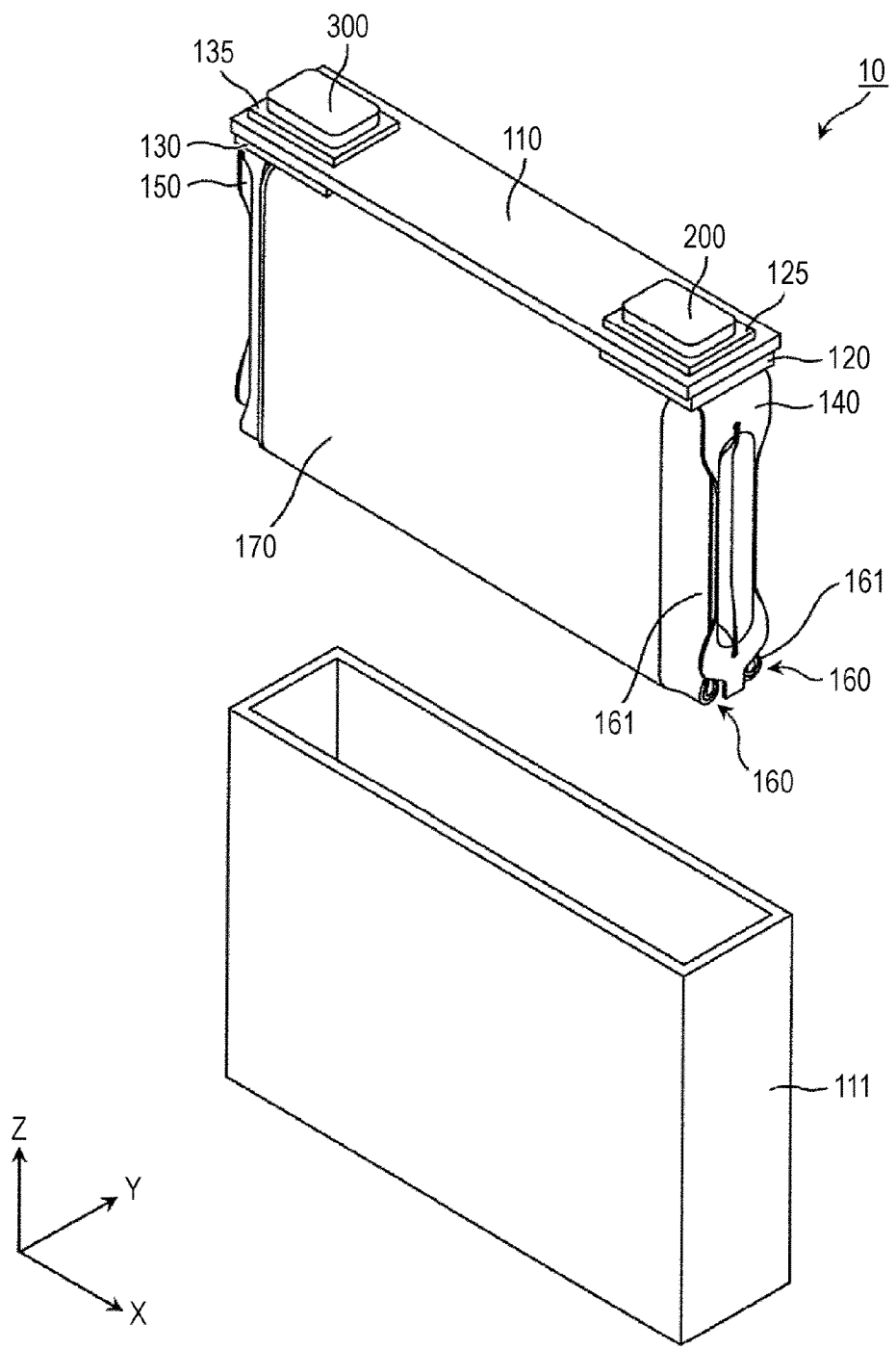
FIG. 2 is a perspective view showing respective constitutional elements which the energy storage device includes in a state where a container body of a container of the energy storage device is separated from the container.

FIG. 1 is a perspective view showing an external appearance of an energy storage device 10 according to the embodiment. FIG. 2 is a perspective view showing respective constitutional elements which the energy storage device 10 includes in a state where a container body 111 of a container 100 of the energy storage device 10 is separated from the container 100.

Figure 3:
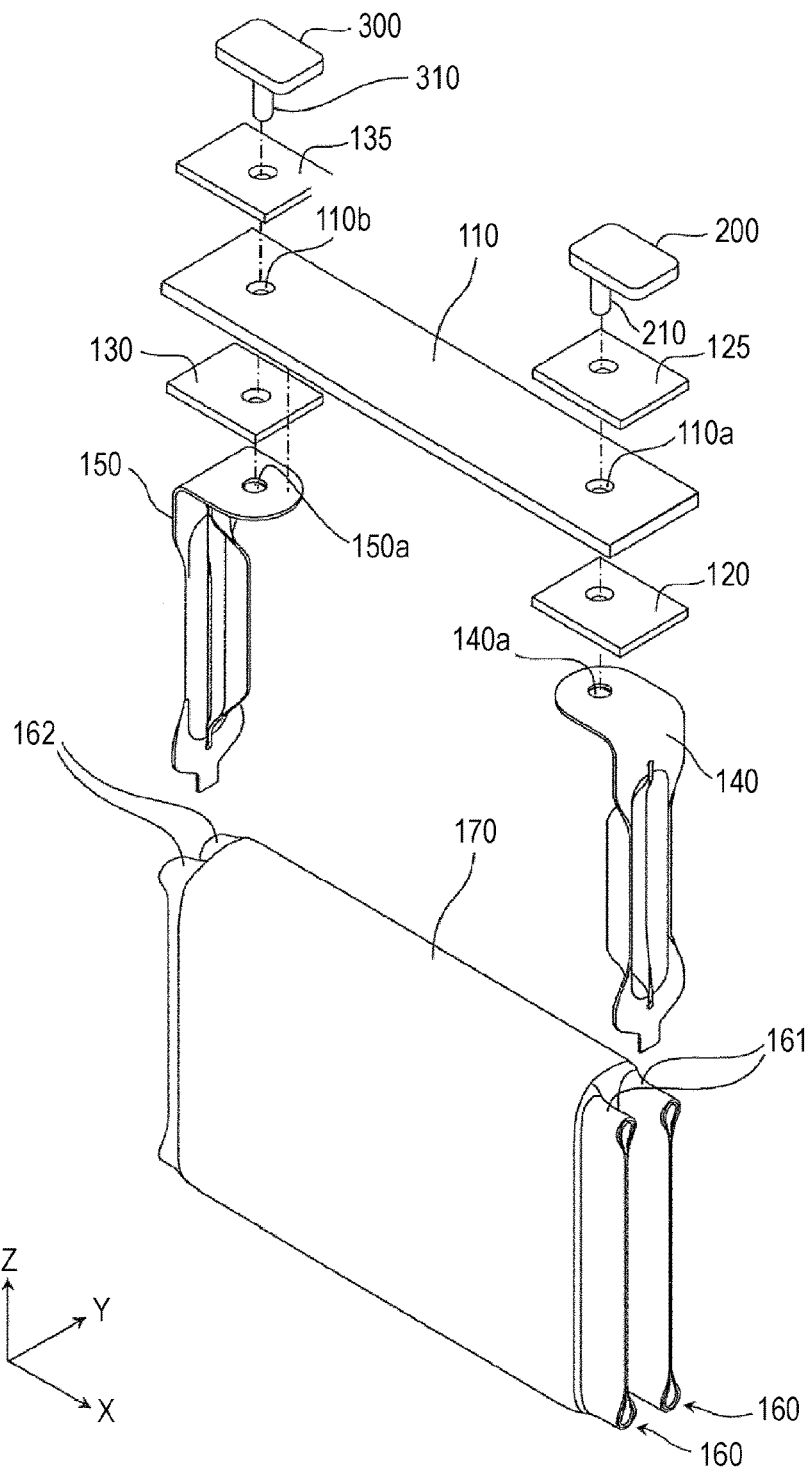
FIG. 3 is an exploded perspective view showing respective constitutional elements in an exploded state.
Figure 4A:
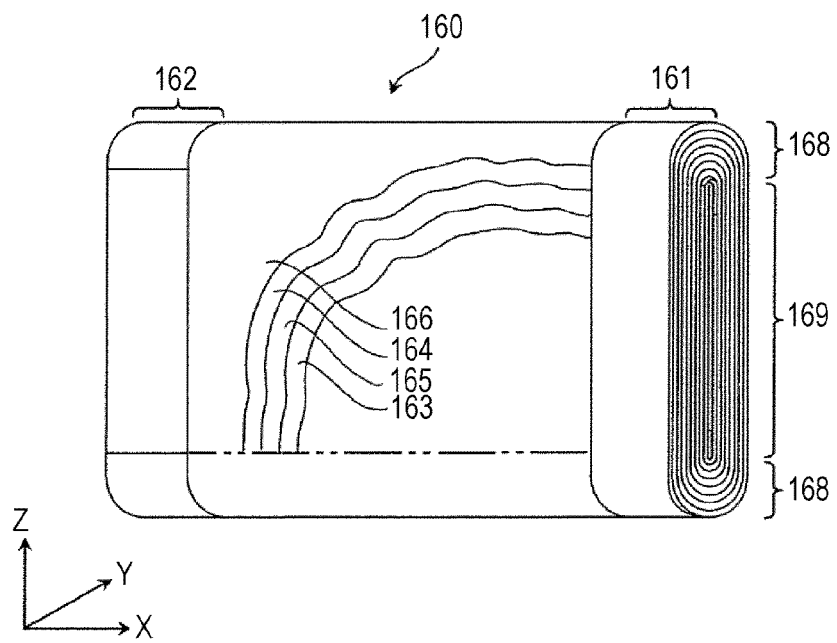
FIG. 4A and FIG. 4B are perspective and side views schematically showing a configuration of an electrode assembly in the embodiment.
Figure 4B:
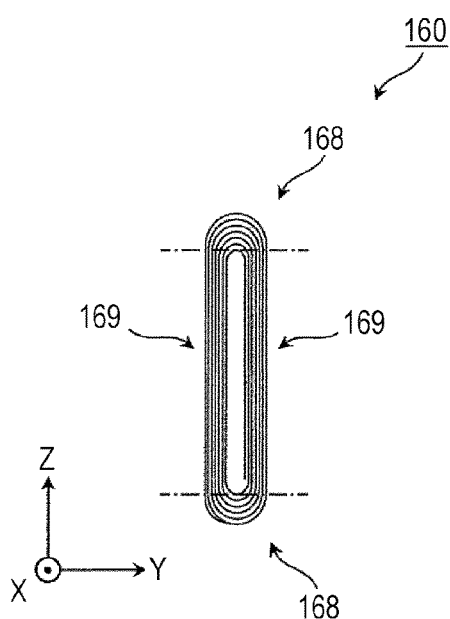

FIG. 3 is an exploded perspective view showing respective constitutional elements. FIG. 4A and FIG. 4B are perspective and side views schematically showing a configuration of an electrode assembly 160 in the embodiment. In FIG. 3, the illustration of the container body 111 of the container 100 is omitted. FIG. 4A and FIG. 4B schematically show the configuration of the electrode assembly 160 in a state before electrode plate welded portions and current collector joined portions described later are formed.

The energy storage device 10 is an energy storage device which includes an electrode assembly formed by stacking electrode plates, and current collectors connected to end portions of the electrode assembly respectively. To be more specific, the energy storage device 10 according to the embodiment has the following configuration.

The energy storage device 10 is a secondary battery capable of charging and discharging electricity. To be more specific, the energy storage device 10 is a nonaqueous electrolyte secondary battery such as a lithium ion secondary battery. Particularly, the energy storage device 10 may be applied to an electric vehicle (EV), a plug-in hybrid electric vehicle (PHEV), or a hybrid electric vehicle (HEV). The energy storage device 10 is not limited to a nonaqueous electrolyte secondary battery, and may be a secondary battery other than a nonaqueous electrolyte secondary battery, or may be a capacitor.

As shown in these drawings, the energy storage device 10 includes the container 100, a positive electrode terminal 200, and a negative electrode terminal 300. The positive electrode terminal 200 is mounted on a lid member 110 with an upper insulating member 125 interposed therebetween, and the negative electrode terminal 300 is mounted on the lid member 110 with an upper insulating member 135 interposed therebetween. In the container 100, lower insulating members 120 and 130, a positive electrode current collector 140, a negative electrode current collector 150, and two electrode assemblies 160 are housed.

A liquid such as an electrolyte solution (nonaqueous electrolyte solution) is sealed in the container 100 of the energy storage device 10. However, the illustration of the liquid is omitted in the drawing. Provided that the performance of the energy storage device 10 is not impaired, a kind of electrolyte solution sealed in the container 100 is not particularly limited, and a certain electrolyte solution can be selected from various electrolyte solutions.

The container 100 is formed of a container body 111 having a bottomed rectangular cylindrical shape, and a lid member 110 formed of a plate-like member which closes an opening of the container body 111. The container 100 is configured such that the inside of the container 100 is sealed by welding the lid member 110 and the container body 111 to each other or by joining the lid member 110 and the container body 111 to each other by other means after two electrode assemblies 160 and the like are housed in the inside of the container 100. Although a material for forming the lid member 110 and a material for forming the container body 111 are not particularly limited, it is preferable that the lid member 110 and the container body 111 be made of weldable metal such as stainless steel, aluminum or an aluminum alloy, for example.

Two electrode assemblies 160 are two power generating elements which are arranged parallel to each other, and both electrode assemblies 160 are electrically connected to the positive electrode current collector 140 and the negative electrode current collector 150. In this embodiment, two electrode assemblies 160 have the same configuration.

The electrode assembly 160 is one example of an electrode assembly formed by stacking electrode plates. In this embodiment, as shown in FIG. 4A, the electrode assembly 160 is formed by alternately stacking two kinds of electrode plates, that is, a positive electrode plate 163 and a negative electrode plate 164 and separators 165, 166 thus forming a stacked body and by winding the stacked body.

To be more specific, the electrode assembly 160 is formed by stacking the positive electrode plate 163, the separator 165, the negative electrode plate 164, and the separator 166 in that order thus forming the stacked body and by winding the stacked body.

As shown in FIG. 4B, the electrode assembly 160 has a flat shape flattened in a direction orthogonal to a direction of the winding axis, as viewed in the Y axis direction in this embodiment. That is, the electrode assembly 160 has an elongated circular shape as a whole as viewed in the direction of the winding axis. Straight line portions of the elongated circular shape are formed into a flat shape, and curved portions of the elongated circular shape are formed into a curved shape. Accordingly, as shown in FIG. 4B, the electrode assembly 160 includes a pair of flat portions 169 which opposedly face each other and a pair of curved portions 168 which opposedly face each other.

The positive electrode plate 163 is formed such that a composite layer (positive composite layer) containing a positive active material is formed on a surface of a metal foil (positive electrode base material layer) having an elongated strip shape and made of aluminum. The negative electrode plate 164 is formed such that a composite layer (negative composite layer) containing a negative active material is formed on a surface of a metal foil (negative electrode base material layer) having an elongated strip shape and made of copper.

As a positive active material used in forming the positive active material layer or a negative active material used in forming the negative active material layer, known materials can be used provided that the positive active material or the negative active material can intercalate and release lithium ions. As the separators 165 and 166, a microporous sheet made of a resin, for example, is adopted.

To describe the electrode assembly 160 having such a configuration more specifically, the positive electrode plate 163 and the negative electrode plate 164 are wound with the separators 165 and 166 interposed therebetween in a state where the positive electrode plate 163 and the negative electrode plate 164 are displaced from each other in a direction of the winding axis.

The positive electrode plate 163 and the negative electrode plate 164 respectively have a non-coated portion where an active material is not coated on respective end portions thereof in the direction along which the positive electrode plate 163 and the negative electrode plate 164 are displaced from each other.

To be more specific, the positive electrode plate 163 has a non-coated portion where a positive active material is not coated on one end thereof in the direction of the winding axis. The negative electrode plate 164 has a non-coated portion where a negative active material is not coated on the other end thereof in the direction of the winding axis. With such a configuration, the electrode assembly 160 has a positive-electrode-side end portion 161 where the non-coated portion of the positive electrode plate 163 are stacked on one end thereof in the direction of the winding axis, and has a negative-electrode-side end portion 162 where the non-coated portion of the negative electrode plate 164 are stacked on the other end thereof in the direction of the winding axis.

That is, the positive-electrode-side end portion 161 is formed of an exposed portion of the positive electrode plate 163 formed of a metal foil and formed in layers, and the negative-electrode-side end portion 162 is formed of an exposed portion of the negative electrode plate 164 formed of a metal foil and formed in layers. The positive-electrode-side end portion 161 is joined to the positive electrode current collector 140, and the negative-electrode-side end portion 162 is joined to the negative electrode current collector 150. As a method of joining these members, ultrasonic welding is adopted, for example.

In this embodiment, on end portions of the electrode assembly 160 (on the positive-electrode-side end portion 161 and the negative-electrode-side end portion 162 respectively), electrode plate welded portions are formed by welding the electrode plates (non-coated portions) which are stacked on together in the stacking direction, and portions of the end portions of the electrode assembly 160 other than the electrode plate welded portions are joined to the current collectors. Such a technical feature is described with reference to FIG. 5A, FIG. 5B and FIG. 6 later.

As shown in FIG. 2 and FIG. 3, two electrode assemblies 160 which the energy storage device 10 includes are bundled to each other by winding an insulation film 170 around the electrode assemblies 160. The insulation film 170 is a rectangular sheet-like member made of a resin. The insulation film 170 is wound around two electrode assemblies 160, and is fixed to the insulation film 170 itself such that a winding end portion of the insulation film 170 is adhered to the insulation film 170 using an insulating tape or the like.

The number of electrode assemblies 160 which the energy storage device 10 includes is not particularly limited, and may be one or three or more. In the energy storage device 10, housing of a plurality of electrode assemblies (two electrode assemblies 160 in this embodiment) in the container 100 is preferable compared with housing of a single electrode assembly in the container 100 having the same volume (volumetric capacity) due to the following reasons, for example.

That is, with the use of a plurality of electrode assemblies in the energy storage device 10, compared to a case where a single electrode assembly is used in the energy storage device 10, dead spaces formed at corner portions of the container 100 are decreased so that a ratio which the electrode assemblies occupy in the container 100 is increased thus leading to the increase in an energy storage capacity of the energy storage device 10. Particularly, in an electrode assembly for high input/output (high rate), compared to a high-capacity type electrode assembly, it is necessary to reduce an amount of an active material on a metal foil so that a ratio which a metal foil and a separator occupy in the electrode assembly is increased. Accordingly, when a single electrode assembly is used, the number of turns of winding of the electrodes becomes large so that the electrode assembly becomes hard and exhibits low flexibility and whereby it becomes difficult to insert the electrode assembly into the container 100. On the other hand, when a plurality of electrode assemblies are used, the number of turns of winding for forming one electrode assembly can be reduced and hence, an electrode assembly which exhibits high flexibility can be realized. Accordingly, it is possible to make dead spaces in the container 100 relatively small.

The positive electrode current collector 140 is disposed on a positive electrode side of two electrode assemblies 160. The positive electrode current collector 140 is a member having conductivity and rigidity, and is electrically connected to the positive electrode terminal 200 and positive electrode plates 163 of two electrode assemblies 160. The positive electrode current collector 140 is made of aluminum, an aluminum alloy or the like in the same manner as the positive electrode base material layer of the electrode assembly 160.

To be more specific, the positive electrode current collector 140 is connected to the positive electrode plates 163 of respective two electrode assemblies 160 by being joined to positive-electrode-side end portions 161 of respective two electrode assemblies 160. An opening portion 140a is formed in the positive electrode current collector 140. By inserting a connecting portion 210 of the positive electrode terminal 200 described later into the opening portion 140a, the positive electrode current collector 140 and the positive electrode terminal 200 are connected to each other.

The negative electrode current collector 150 is disposed on a negative electrode side of two electrode assemblies 160. The negative electrode current collector 150 is a member having conductivity and rigidity, and is electrically connected to the negative electrode terminal 300 and the negative electrode plates 164 of two electrode assemblies 160. The negative electrode current collector 150 is made of copper, a copper alloy or the like in the same manner as the negative electrode base material layer of the electrode assembly 160.

To be more specific, the negative electrode current collector 150 is connected to the negative electrode plates 164 of respective two electrode assemblies 160 by being joined to negative-electrode-side end portions 162 of respective two electrode assemblies 160. An opening portion 150a is formed in the negative electrode current collector 150. By inserting a connecting portion 310 of the negative electrode terminal 300 described later into the opening portion 150a, the negative electrode current collector 150 and the negative electrode terminal 300 are connected to each other.

The upper insulating member 125 is a member which electrically insulates the positive electrode terminal 200 and the lid member 110 from each other. The lower insulating member 120 is a member which electrically insulates the positive electrode current collector 140 and the lid member 110 from each other. The upper insulating member 135 is a member which electrically insulates the negative electrode terminal 300 and the lid member 110 from each other. The lower insulating member 130 is a member which electrically insulates the negative electrode current collector 150 and the lid member 110 from each other. The upper insulating member 125, 135 may also be referred to as an upper gasket, for example. The lower insulating member 120, 130 may also be referred to as a lower gasket, for example. That is, in this embodiment, the upper insulating members 125, 135 and the lower insulating members 120, 130 also have a function of sealing a space between the electrode terminal (200 or 300) and the container 100.

The positive electrode terminal 200 is an electrode terminal electrically connected to the positive-electrode-side end portions 161 of two electrode assemblies 160. The negative electrode terminal 300 is an electrode terminal electrically connected to the negative-electrode-side end portions 162 of two electrode assemblies 160. As shown in FIG. 3, the connecting portion 210 which electrically connects the positive electrode terminal 200 and the positive electrode current collector 140 to each other is formed on the positive electrode terminal 200.

The connecting portion 210 is a member which is inserted into the opening portion 140a formed in the positive electrode current collector 140 and is connected to the positive electrode current collector 140. The connecting portion 210 is formed of a rivet, for example. That is, the connecting portion 210 formed on the positive electrode terminal 200 is inserted into an opening portion formed in the upper insulating member 125, a through hole 110a formed in the lid member 110, an opening portion formed in the lower insulating member 120, and the opening portion 140a formed in the positive electrode current collector 140, and the connecting portion 210 is swaged. Accordingly, the positive electrode terminal 200 is fixed to the lid member 110 together with the upper insulating member 125, the lower insulating member 120, and the positive electrode current collector 140.

In the same manner, the connecting portion 310 which electrically connects the negative electrode terminal 300 and the negative electrode current collector 150 is formed on the negative electrode terminal 300. The connecting portion 310 formed on the negative electrode terminal 300 is inserted into an opening portion formed in the upper insulating member 135, a through hole 110b formed in the lid member 110, an opening portion formed in the lower insulating member 130, and an opening portion 150a formed in the negative electrode current collector 150, and the connecting portion 310 is swaged. Accordingly, the negative electrode terminal 300 is fixed to the lid member 110 together with the upper insulating member 135, the lower insulating member 130, and the negative electrode current collector 150.

Next, the configuration of the current collector in this embodiment is described in detail with reference to the positive electrode current collector 140. The positive electrode current collector 140 and the negative electrode current collector 150 have substantially the same configuration and hence, the positive electrode current collector 140 is described hereinafter, and the description of the negative electrode current collector 150 is omitted.

Figures 5A, 5B:
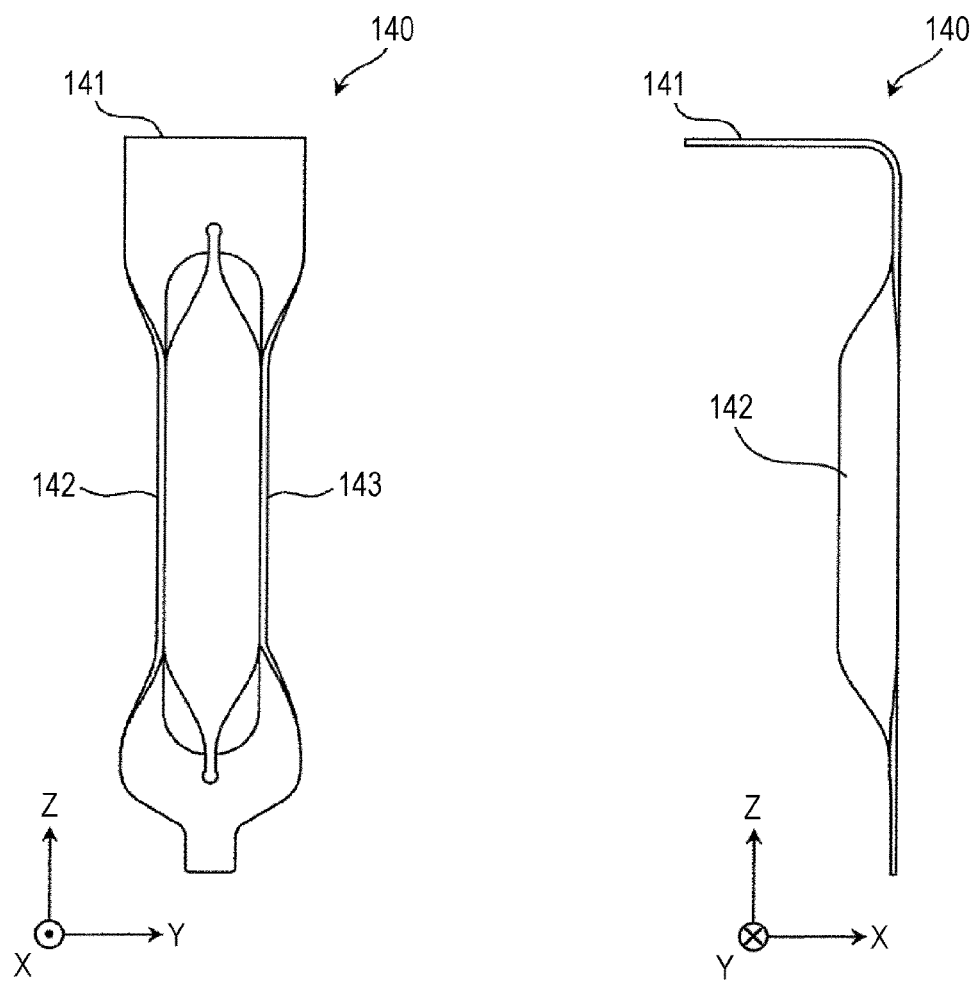
FIG. 5A and FIG. 5B are views showing the configuration of a positive electrode current collector in the embodiment.

FIG. 5A and FIG. 5B are views showing the configuration of the positive electrode current collector 140 in the embodiment. To be more specific, FIG. 5A is a front view of the positive electrode current collector 140 as viewed from a front side (a plus side in the X axis direction), and FIG. 5B is a side view of the positive electrode current collector 140 as viewed from a lateral side (a minus side in the Y axis direction).

The positive electrode current collector 140 in this embodiment includes: a terminal connecting portion 141 which is connected to the positive electrode terminal 200 and in which the opening portion 140a (see FIG. 3) is formed; and two connecting plate portions 142 and 143 which are connected to two electrode assemblies 160 respectively.

The terminal connecting portion 141 and two connecting plate portions 142 and 143 can be respectively formed as an integral body by applying working such as bending and drawing to a plate member made of aluminum or an aluminum alloy, for example.

A shape of the positive electrode current collector 140 shown in FIG. 4A, FIG. 4B and the like is one example. Provided that the positive electrode current collector 140 can connect the positive electrode terminal 200 and at least one electrode assembly 160 with each other, various shapes can be adopted as a shape of the positive electrode current collector 140.

Two connecting plate portions 142 and 143 are joined to end portions (the positive-electrode-side end portions 161 in this embodiment) of the electrode assemblies 160 respectively by ultrasonic welding, for example. At each joined portion, the stacked electrode plates which form the positive-electrode-side end portion 161 are welded together thus forming one collective body, and are joined to the connecting plate portion 142, 143 of the positive electrode current collector 140.

The "stacked electrode plates" may be formed by winding or folding one sheet of electrode plate or may be formed by making a plurality of electrode plates formed of separate members overlap with each other, for example. To be more specific, in this embodiment, the non-coated portion of the wound positive electrode plate 163 corresponds to the stacked electrode plates of the positive-electrode-side end portion 161. Further, the non-coated portion of the wound negative electrode plate 164 corresponds to the stacked electrode plates of the negative-electrode-side end portion 162.

In the energy storage device 10 according to this embodiment, the positive-electrode-side end portion 161 has portions where the stacked electrode plates are welded to each other (electrode plate welded portions) besides joined portions (current collector joined portions).

Figure 6:
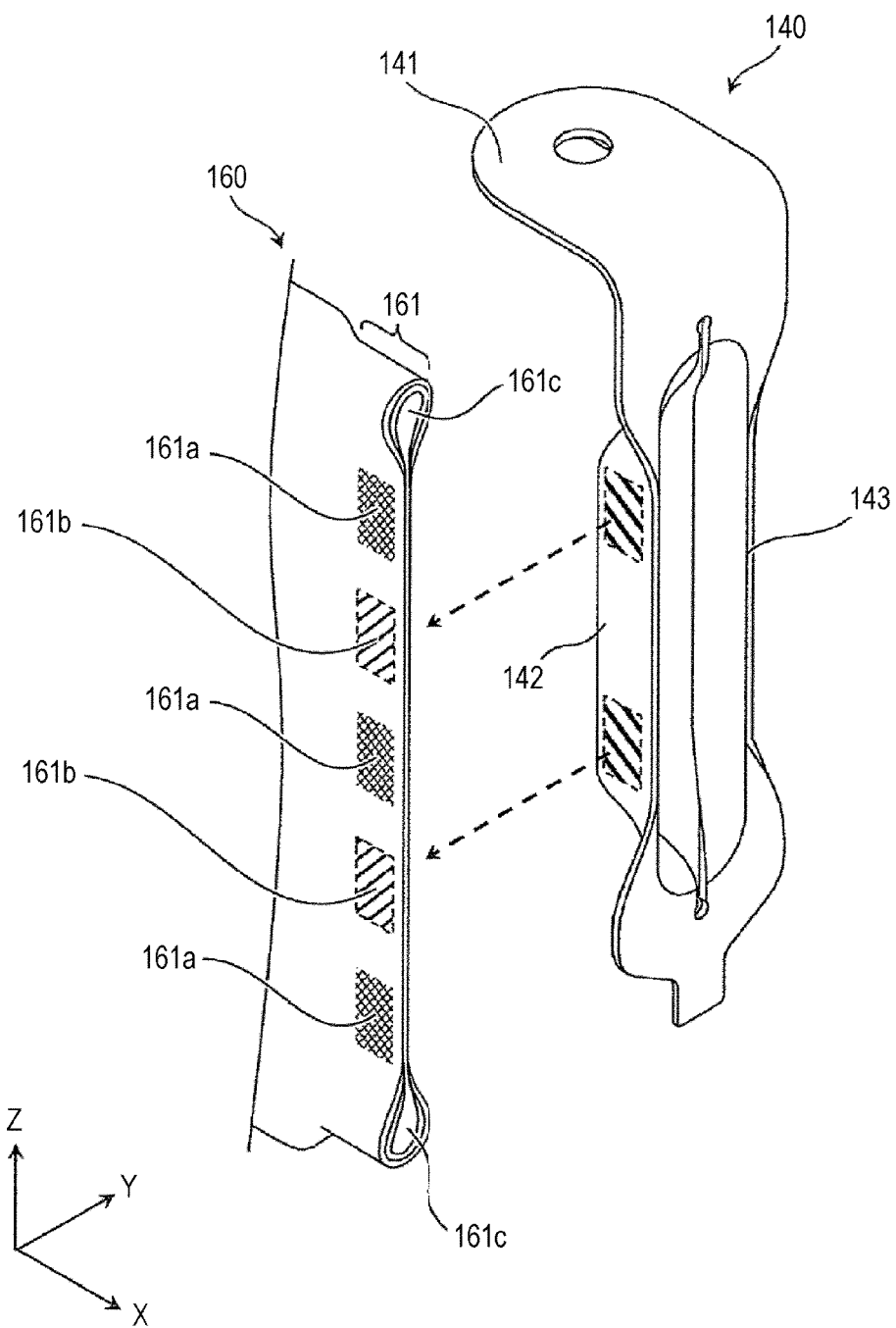
FIG. 6 is a perspective view showing electrode plate welded portions and current collector joined portions in the embodiment.

FIG. 6 is a perspective view showing electrode plate welded portions 161a and current collector joined portions 161b in the embodiment. As shown in FIG. 6, the positive-electrode-side end portion 161 of the electrode assembly 160 has the electrode plate welded portions 161*a* and the current collector joined portions 161*b*.

The electrode plate welded portion 161*a* is a portion which is formed by welding the stacked electrode plates in the stacking direction (the Y axis direction in this embodiment), and which is not joined to the positive electrode current collector 140. The current collector joined portion 161*b* is a portion which is joined to the positive electrode current collector 140. The current collector joined portions 161*b* are arranged in a row together with (arranged adjacently to) the electrode plate welded portions 161*a* in a direction which intersects with the stacking direction (the Z axis direction in this embodiment). "Electrode plate welded portion" can also be referred to as "electrode plate welded fixing portion" which is a portion formed by fixing the stacked electrode plates in the stacking direction by welding. Further, in this embodiment, a direction along which the electrode plate welded portions 161*a* and the current collector joined portions 161*b* are arranged in a row can also be referred to as a longitudinal direction of the connecting plate portion 142 of the positive electrode current collector 140, for example.

The electrode plate welded portions 161*a* are formed on the positive-electrode-side end portion 161 before the positive-electrode-side end portion 161 and the connecting plate portion 142 of the positive electrode current collector 140 are joined to each other. That is, steps of manufacturing the energy storage device 10 include: a first step where the electrode plate welded portions 161*a* are formed on the end portion of the electrode assembly 160; and a second step where the current collector joined portions 161*b* are formed on portions of the end portion of the electrode assembly 160 other than the electrode plate welded portions 161*a*.

In this embodiment, the second step is performed after the completion of the first step. However, the first step and at least a portion of the second step may be performed in parallel. Further, although a technique for forming the electrode plate welded portions 161*a* is not particularly limited, ultrasonic welding is used, for example, in the same manner as the case where the current collector joined portions 161*b* are formed.

As described above, in this embodiment, the electrode plate welded portions 161*a* are formed on portions of the positive-electrode-side end portion 161 of the electrode assembly 160, and the current collector joined portions 161*b* are formed on other portions of the positive-electrode-side end portion 161 of the electrode assembly 160. Accordingly, an amount of gap formed between the electrode plates (a total area of the gap as viewed in a direction of the winding axis) at the positive-electrode-side end portion 161 can be reduced. As a result, for example, the intrusion of a foreign substance such as metal powder into the electrode assembly 160 from the positive-electrode-side end portion 161 of the electrode assembly 160 can be suppressed. Accordingly, for example, it is possible to reduce a possibility of the occurrence of a defect such as minute short-circuiting in the inside of the electrode assembly 160 caused by a foreign substance such as metal powder or the lowering of an amount of power generation due to the occurrence of minute short-circuiting.

The current collector joined portions 161*b* are disposed at positions where the current collector joined portions 161*b* are arranged in a row with the electrode plate welded portions 161*a* in a direction which intersects with the stacking direction. That is, at the positive-electrode-side end portion 161 of the electrode assembly 160, portions to which an operation such as applying of vibrations or applying of heat for welding is not applied and the positive electrode current collector 140 are joined to each other using a technique such as ultrasonic welding. In other words, the positive-electrode-side end portion 161 and the positive electrode current collector 140 are joined to each other at positions while avoiding portions where there is a possibility that a strength of the positive-electrode-side end portion 161 is lowered due to an operation such as applying vibrations or applying heat. With such a configuration, for example, quality of joining between the positive-electrode-side end portion 161 of the electrode assembly 160 and the current collector is guaranteed. As described above, the energy storage device 10 according to the embodiment can realize a highly reliable energy storage device.

In this embodiment, as shown in FIG. 6, three electrode plate welded portions 161*a* and two current collector joined portions 161*b* are arranged at the positive-electrode-side end portion 161 of the electrode assembly 160. Further, out of three electrode plate welded portions 161*a*, two electrode plate welded portions 161*a* are arranged at both sides of two current collector joined portions 161*b* in the arrangement direction.

To describe such a configuration in a simplified manner, two electrode plate welded portions 161*a* are arranged at positions which sandwich a region of the positive-electrode-side end portion 161 to be joined to the positive electrode current collector 140. Accordingly, for example, even when a jig for pressing the stacked electrode plates (non-coated portions stacked on together) in the stacking direction is not used at the time of joining the positive-electrode-side end portion 161 and the positive electrode current collector 140 to each other (at the time of forming the current collector joined portions 161*b*), the positive-electrode-side end portion 161 and the positive electrode current collector 140 can be joined to each other with high accuracy. Further, in this embodiment, the electrode plate welded portion 161*a* is also arranged between two current collector joined portions 161*b*. This arrangement contributes to the enhancement of joining accuracy or joining quality in the case where the positive-electrode-side end portion 161 and the positive electrode current collector 140 are joined to each other without using the above-mentioned jig.

Further, in this embodiment, the electrode assembly 160 is a winding-type electrode assembly having the pair of oppositely facing flat portions 169 and the curved portions 168 which connect the pair of flat portions 169 to each other (see FIG. 5B). In the electrode assembly 160 having such a shape, the electrode plate welded portions 161*a* are portions of the pair of flat portions 169 formed by welding the stacked electrode plates. Further, the current collector joined portions 161*b* are portions of the pair of flat portions 169 where the stacked electrode plates are collectively joined to the positive electrode current collector 140.

To be more specific, in this embodiment, the electrode plate welded portions 161*a* are portions of the pair of flat portions 169 formed by collectively welding the stacked electrode plates. Further, in this embodiment, the current collector joined portions 161*b* are portions of the pair of flat portions 169 where the stacked electrode plates are collectively joined to the positive electrode current collector 140.

That is, the electrode plate welded portions 161*a* and the current collector joined portions 161*b* are formed such that end portions of the pair of flat portions 169 are closed. Accordingly, for example, it is possible to bring about a state where an opening of a space about a winding axis (winding axis space) which exists in the winding-type electrode assembly 160 is substantially closed.

As a result, a portion of the winding-type electrode assembly 160 usually having a relatively large opening area is brought into a closed state and hence, an effect of suppressing the intrusion of a foreign substance into the inside of the electrode assembly 160 can be further enhanced.

Further, in the electrode assembly 160 having such a shape, as shown in FIG. 6, the positive-electrode-side end portion 161 further includes non-welded portions 161c which are portions where the stacked electrode plates are not welded to each other at positions of the curved portions 168. That is, a portion where the gap formed between the electrode plates is not closed is left at portions of the end portions of the winding-type electrode assembly 160. With such a configuration, for example, it is possible to ensure a path for infiltration of an electrolyte solution into the electrode assembly 160. That is, such a configuration contributes to the enhancement of quality of the electrode assembly 160 (energy storage device 10).

In this embodiment, the electrode plate welded portions 161a are formed by welding the stacked electrode plates to each other by ultrasonic wave vibrations. Further, the positive-electrode-side end portion 161 of the electrode assembly 160 and the positive electrode current collector 140 are joined to each other by ultrasonic welding of the current collector joined portions 161b.

Accordingly, for example, the same facility (ultrasonic welding machine) can be used both in forming the electrode plate welded portions 161a and in forming the current collector joined portions 161b. Further, both the electrode plate welded portions 161a and the current collector joined portions 161b can be formed within a short time and with certainty.

The number of electrode plate welded portions 161a and the number of current collector joined portions 161b are not particularly limited, and it is sufficient that one or more electrode plate welded portions 161a and one or more current collector joined portions 161b be disposed at the positive-electrode-side end portion 161.

It is not always necessary that the arrangement direction of the electrode plate welded portions 161a and the arrangement direction of the current collector joined portions 161b agree with each other in the Z axis direction (the longitudinal direction of the connecting plate portion 142). For example, the positions of the electrode plate welded portions 161a and the position of the current collector joined portions 161b may be displaced from each other in the X axis direction as viewed in a side view (as viewed from a minus side in the Y axis direction).

Further, for example, the electrode plate welded portions 161a and the current collector joined portions 161b may be arranged in a direction of the winding axis (a direction along which both end portions (161, 162) of the electrode assembly 160 are arranged, being equal to the X axis direction in this embodiment). For example, at the positive-electrode-side end portion 161, the electrode plate welded portions 161a may be arranged on a negative electrode side (a minus side in the X axis direction), and the current collector joined portions 161b may be arranged more on the outside than the electrode plate welded portions 161a (a plus side in the X axis direction).

In this case, by forming the electrode plate welded portion 161a into an elongated shape extending in the Z axis direction, for example, or by arranging a plurality of electrode plate welded portions 161a in a row in the Z axis direction, the positive-electrode-side end portion 161 of the electrode assembly 160 can be closed in a relatively wide range. As a result, it is possible to acquire an effect of suppressing the intrusion of a foreign substance. Further, by leaving a non-welded portion outside the electrode plate welded portion 161a (on a plus side in the X axis direction), such a portion can be effectively used as a portion to be joined with the positive electrode current collector 140 (that is, the current collector joined portion 161b).

In this embodiment, the electrode plate welded portions 161a and the current collector joined portions 161b in the positive-electrode-side end portion 161 are illustrated, and the description is made with respect to these portions. In the same manner as the positive-electrode-side end portion 161, one or more electrode plate welded portions and one or more current collector joined portions may also be disposed at the negative-electrode-side end portion 162. Also with such a configuration, it is possible to acquire an effect of suppressing the intrusion of a foreign substance into the inside of the electrode assembly 160.

As described above, the electrode assembly 160 includes the separators 165 and 166. In this embodiment, a portion of the separator 166 is disposed on the outermost side of the electrode assembly 160. Further, neither the electrode plate welded portions 161a nor the current collector joined portions 161b are provided with the separators 165 and 166. Accordingly, on a positive electrode side of the electrode assembly 160, a gap formed between an outermost periphery of the positive electrode plate 163 of the electrode assembly 160 and the separator 166 wound around an outer periphery of the positive electrode plate 163 is not closed by forming the electrode plate welded portions 161a and the current collector joined portions 161b.

In view of the above, the energy storage device 10 may include a pressing member for closing the gap formed inside the portion of the separator 166. Hereinafter, a mode where the energy storage device 10 includes the pressing member is described as modifications 1 and 2 of the above-mentioned embodiment by mainly focusing on the difference between the modifications 1, 2 and the above-mentioned embodiment.

(Modification 1)

Figure 7:
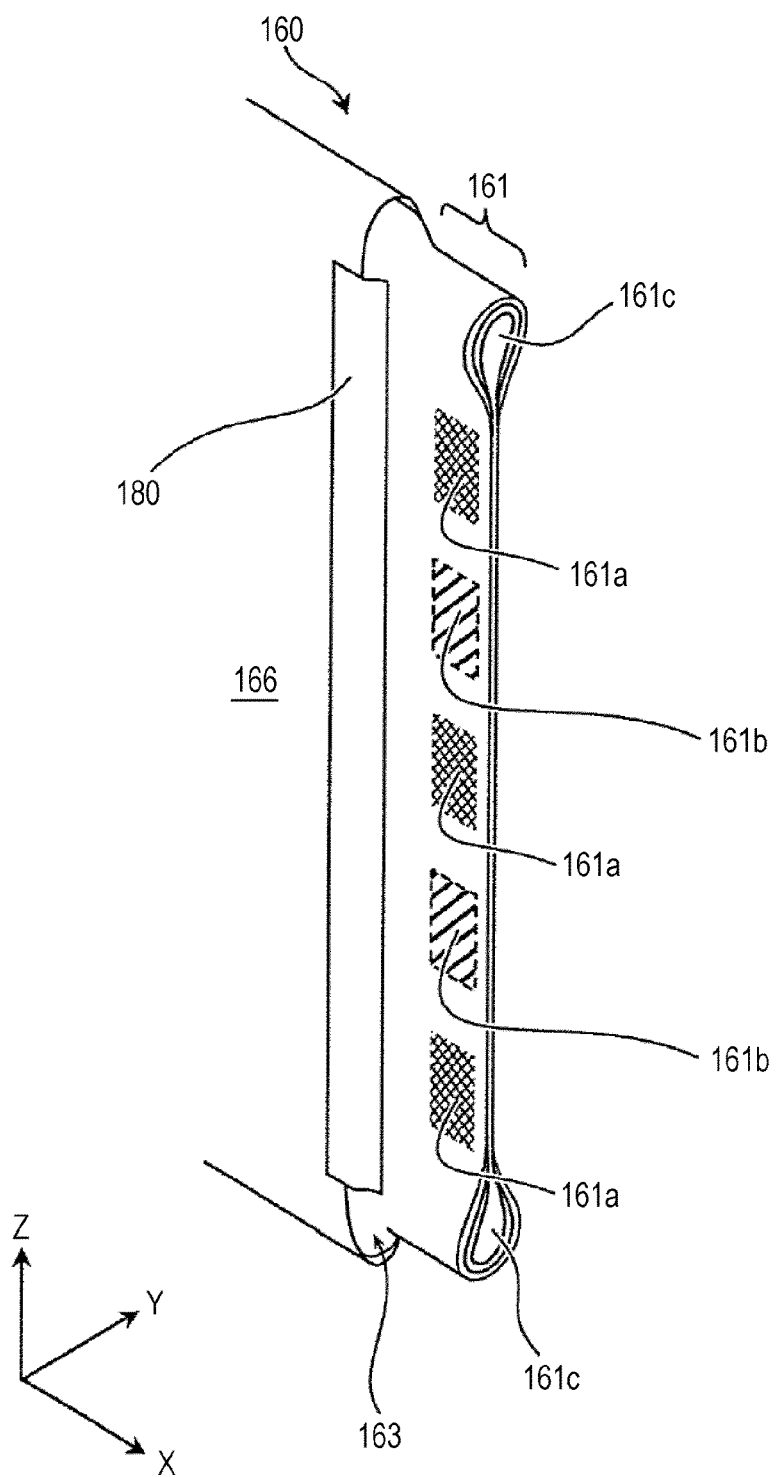
FIG. 7 is a perspective view schematically showing the configuration of a pressing member in a modification 1 of the embodiment.

FIG. 7 is a perspective view schematically showing the configuration of a pressing member 180 in the modification 1 of the embodiment. As described in the above-mentioned embodiment, the electrode assembly 160 shown in FIG. 7 includes a separator 166 disposed on an outermost side of the electrode assembly 160 (see FIG. 4A). To be more specific, the separator 166 is disposed between two kinds of electrode plates, that is, a positive electrode plate 163 and a negative electrode plate 164, and a portion of the separator 166 is disposed on the outermost side of the electrode assembly 160.

An energy storage device 10 according to this modification is characterized by including the pressing member 180 which presses an end edge portion of the separator 166 close to a positive-electrode-side end portion 161 of the electrode assembly 160 in a direction toward the inside of the electrode assembly 160.

To be more specific, in this modification, a tape made of an insulating resin is adopted as the pressing member 180. As shown in FIG. 7, the pressing member 180 is adhered to the separator 166 and the electrode plate disposed inside the separator 166 (positive electrode plate 163 in this modification) such that the pressing member 180 straddles a boundary between an end edge of the separator 166 and the positive electrode plate 163.

With such a configuration, an amount of gap formed inside the end edge of the separator 166 can be reduced. As a result, the intrusion of a foreign substance such as metal powder from the end edge of the separator 166 can be suppressed. In FIG. 7, the pressing member 180 disposed on a viewer's side (a minus side in a Y axis direction) of the positive-electrode-side end portion 161 is illustrated. However, the pressing member 180 may also be disposed on a depth side (a plus side in a Y axis direction) of the positive-electrode-side end portion 161 in the same manner. With such a configuration, an effect of suppressing the intrusion of a foreign substance into the inside of the electrode assembly 160 can be further enhanced.

As a tape to be adopted as the pressing member 180, for example, an insulating adhesive tape is used where an adhesive agent such as an acrylic-based adhesive agent or a silicone-based adhesive agent is applied by coating to a base material made of a heat-resistant resin such as polypropylene (PP), polyphenylene sulfide (PPS), polyethylene terephthalate (PET) or a fluororesin.

The energy storage device 10 according to this modification can also be expressed as follows. That is, the energy storage device 10 according to this modification is the energy storage device 10 which includes: the electrode assembly 160 formed by stacking the electrode plates (the positive electrode plate 163 and the negative electrode plate 164 in this modification); and the positive electrode current collector 140 connected to the positive-electrode-side end portions 161 of the electrode assemblies 160, wherein the energy storage device 10 further includes the tape (pressing member 180) which is adhered to the separator 166 disposed on an outermost side of the electrode assembly 160 and the positive electrode plate 163 disposed inside the separator 166 such that the tape straddles a boundary between the end edge of the separator 166 close to the positive-electrode-side end portion 161 of the electrode assembly and the positive electrode plate 163.

With such a configuration, a gap formed between the separator 166 disposed on the outermost side of the electrode assembly 160 and the positive electrode plate 163 disposed inside the separator 166 is closed by the tape (pressing member 180) and hence, the intrusion of a foreign substance such as metal powder from the gap can be suppressed.

(Modification 2)

Figure 8:
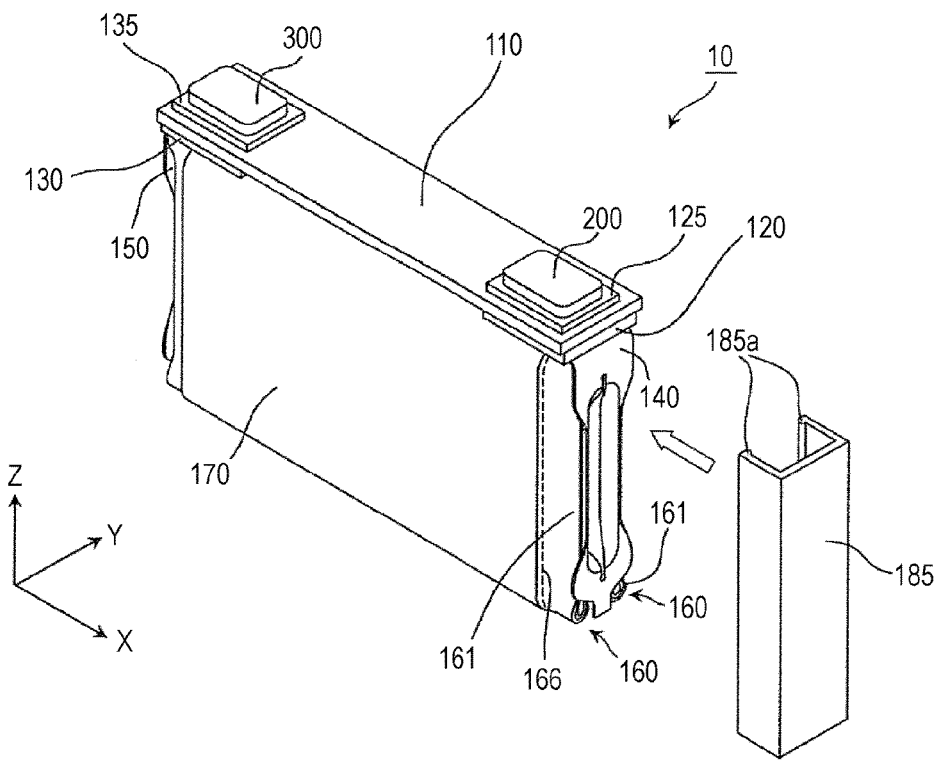
FIG. 8 is a perspective view schematically showing the configuration of a pressing member in a modification 2 of the embodiment.
Figure 9:
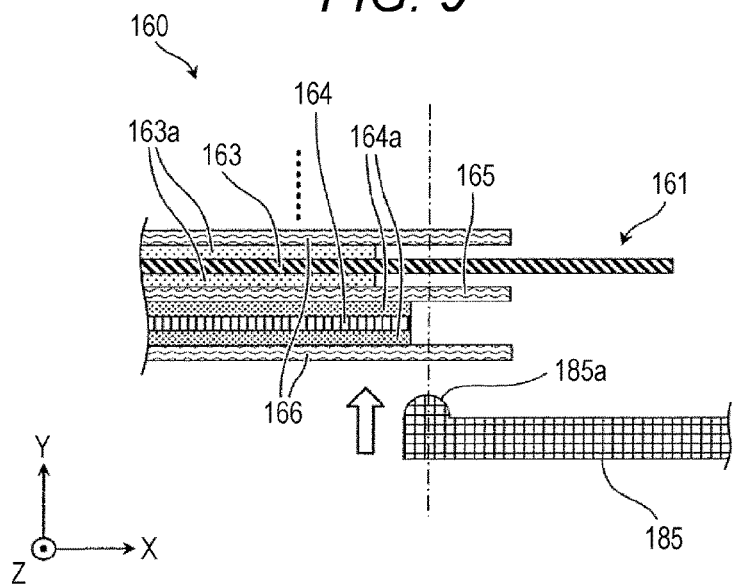
FIG. 9 is a cross-sectional view showing one example of a pressing position where an electrode assembly is pressed by the pressing member shown in FIG. 8.

FIG. 8 is a perspective view schematically showing the configuration of a pressing member 185 in a modification 2 of the embodiment. FIG. 9 is a cross-sectional view showing one example of a pressing position where an electrode assembly 160 is pressed by the pressing member 185 shown in FIG. 8.

As shown in FIG. 8, the pressing member 185 in this modification is realized as a spacer mounted on a positive electrode current collector 140 side of the electrode assemblies 160. To be more specific, the pressing member 185 is arranged between an inner surface of a container 100 and the electrode assemblies 160 and a positive electrode current collector 140. The pressing member 185 also functions as a member which restricts the movement of the electrode assemblies 160 and the positive electrode current collector 140 in the inside of the container 100. The pressing member 185 also functions as a member which electrically insulates the electrode assemblies 160 and the positive electrode current collector 140 from the container 100.

The pressing member 185 formed in such a mode is made of an insulating material which is a heat-resistant or heat insulating material such as PP, PPS, PET or ceramic or a composite material made of these materials, for example.

The pressing member 185 in this modification includes a pair of projecting portions 185a which opposedly face each other in a thickness direction of the electrode assembly 160 (Y axis direction). The pair of projecting portions 185a is formed at positions where the projecting portions 185a press end edge portions of the separators 166 on both sides of the electrode assembly 160 in a thickness direction when the pressing member 185 is mounted on the positive electrode current collector 140 side of the electrode assemblies 160.

With such a configuration, in the same manner as the pressing member 180 in the above-mentioned modification 1, the pressing member 185 can acquire an effect of suppressing the intrusion of a foreign substance into the inside of the electrode assembly 160. To be more specific, a stack structure shown in FIG. 9 is formed on an outermost periphery of the electrode assembly 160 in the vicinity of the positive-electrode-side end portion 161, for example. That is, the structure is provided where the separator 166 disposed on the outermost periphery, a positive electrode plate 163 where a positive composite layer 163a is formed on both surfaces of the positive electrode plate 163, a separator 165, and a negative electrode plate 164 where a negative composite layer 164a is formed on both surfaces of the negative electrode plate 164 are stacked in that order. Although the separator 166 disposed on the outermost periphery is shown in one layer in FIG. 9, the separator 166 is, in general, formed in plural layers on the outermost periphery of the winding-type electrode assembly 160 by winding the separator 166 plural times.

As shown in FIG. 9, in the electrode assemblies 160 having such a stack structure, the projecting portions 185a which the pressing member 185 includes press the separators 166 in a direction toward the inside of the electrode assemblies 160 (a plus side in a Y axis direction in FIG. 9). The projecting portions 185a press an end edge portion of a portion of the separator 166 disposed on an outermost side of the electrode assembly 160 (a minus side in a Y axis direction in FIG. 9) at a position between an end edge of the portion of the separator 166 and the electrode plate (negative electrode plate 164) having polarity opposite to polarity of an end portion of the electrode assembly 160 on a side where the separator 166 is mounted (positive-electrode-side end portion 161).

In other words, the pressing member 185 presses the separator 166 at a desired position between the end edge of the portion of the separator 166 and the position where the positive electrode plate 163 and the negative electrode plate 164 opposedly face each other with the separator 165 interposed therebetween.

With such a configuration, even if a conductive foreign substance such as metal powder intrudes into the electrode assembly 160 from the end edge of the separator 166, the occurrence of minute short-circuiting due to the foreign substance can be suppressed. To be more specific, when minute metal forming a foreign substance is brought into contact with the positive electrode plate 163 of the electrode assembly 160, the metal is ionized depending on the metal. When the ionized metal arrives at the negative electrode plate 164 positioned close to the ionized metal, there is a possibility that metal is precipitated so that dendrite is formed, and the dendrite penetrates the separator 165 thus causing minute short-circuiting between the positive electrode plate 163 and the negative electrode plate 164.

However, in the energy storage device 10 according to this modification, as shown in FIG. 9, for example, the end edge portion of the separator 166 is pressed by the pressing member 185 at a position closer to the positive-electrodeside end portion 161 than the negative electrode plate 164 (at a position on a plus side in the X axis direction). With such a configuration, even if metal is ionized, it is possible to prevent the ionized metal from arriving at the negative electrode plate 164. As a result, the occurrence of minute short-circuiting due to a foreign substance such as metal powder can be suppressed.

Further, as described above, the pressing members 185 can be realized as spacers which restrict the movement of the electrode assemblies 160 and the like, for example. Accordingly, when the energy storage device 10 includes the spacer, it is unnecessary for the energy storage device 10 to additionally include a member for pressing the end edge portion of the separator 166.

To increase an effect of suppressing the intrusion of a foreign substance from the end edge portion of the separator 166, the pressing member 180 in the previously-mentioned modification 1 and the pressing member 185 in this modification 2 may be used in combination.

(Modification 3)

In the above-mentioned embodiment and the modifications 1 and 2, the positive electrode current collector 140 is disposed with respect to two electrode assemblies 160 such that two connecting plate portions 142 and 143 are sandwiched between the positive-electrode-side end portions 161 of two electrode assemblies 160. However, the mode of connection between the positive electrode current collector and the electrode assemblies is not limited to such a mode. For example, the current collector may be disposed such that two connecting plate portions sandwich the end portions (161 or 162) of two electrode assemblies 160. The current collector where two connecting plate portions are disposed as described above is described as a modification 3 by mainly focusing on a difference between the modification 3 and the above-mentioned embodiment.

Figure 10:
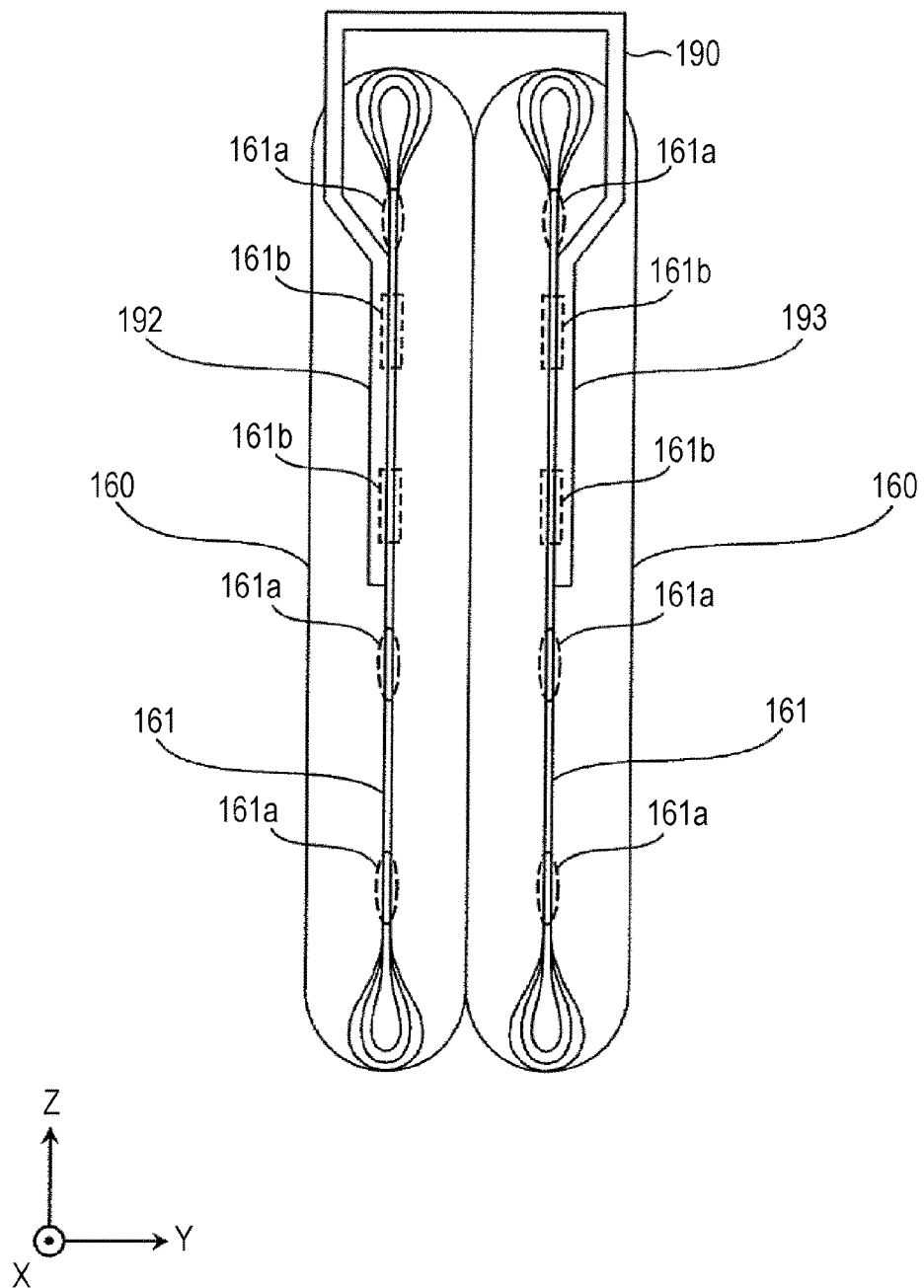
FIG. 10 is a front view showing one example of a shape of a positive electrode current collector in a modification 3 of the embodiment.

FIG. 10 is a front view showing one example of a shape of a positive electrode current collector 190 in the modification 3 of the embodiment. In FIG. 10, approximate positions of electrode plate welded portions 161a are indicated by dotted ellipses, and approximate positions of current collector joined portions 161b are indicated by dotted rectangles.

The positive electrode current collector 190 shown in FIG. 10 includes two connecting plate portions 192 and 193, and the connecting plate portions 192 and 193 are connected to the positive-electrode-side end portions 161 of the electrode assemblies 160 respectively. Such a configuration of the positive electrode current collector 190 is substantially equal to the corresponding configuration of the positive electrode current collector 140 in the above-mentioned embodiment. However, the positive electrode current collector 190 in this modification differs from the positive electrode current collector 140 in the above-mentioned embodiment with respect to a point that two connecting plate portions 192 and 193 are disposed so as to sandwich the positive-electrode-side end portions 161 of two electrode assemblies 160 therebetween.

In this manner, an energy storage device 10 may be configured such that a surface of the positive-electrode-side end portion 161 on an outer side (a side where the other electrode assembly 160 is not disposed) and the positive electrode current collector 190 are joined to each other. Also in this case, it is possible to acquire the above-mentioned effect of suppressing the intrusion of a foreign substance into the inside of the electrode assembly 160 brought about by the formation of the electrode plate welded portions 161a and the current collector joined portions 161b.

An arrangement pattern of the electrode plate welded portions 161a and the current collector joined portions 161b shown in FIG. 10 merely forms one example, and the electrode plate welded portions 161a and the current collector joined portions 161b may be arranged in other patterns. For example, in the same manner as the above-mentioned embodiment, one electrode plate welded portion 161a may be arranged between two current collector joined portions 161b.

(Other Technical Features)

The energy storage device according to the present invention has been described heretofore with reference to the embodiment and the modifications of the embodiment. However, the present invention is not limited to the above-mentioned embodiment and the modifications of the embodiment. Configurations which are acquired by applying various modifications conceived by those who are skilled in the art to the embodiment and the modifications of the embodiment, or configurations acquired by combining the above-described plurality of constitutional elements are also included in the scope of the present invention unless these configurations depart from the gist of the present invention.

For example, the technique for joining the positive electrode current collector 140 to the positive-electrode-side end portions 161 of the electrode assemblies 160 is not limited to ultrasonic welding, and other welding such as resistance welding, laser welding or electron beam welding may be used. A mechanical joining technique such as clinch joining may also be used.

A technique for welding the stacked electrode plates which is used for forming the electrode plate welded portions 161a of the positive-electrode-side end portion 161 is also not limited to ultrasonic welding, and other techniques such as resistance welding, laser welding, and electron beam welding may also be used.

The structure of the electrode assembly 160 which the energy storage device 10 includes is not limited to the winding-type structure. The electrode assembly 160 may adopt the structure where a flat-plate-like positive electrode plate and a flat-plate-like negative electrode plate are alternatively stacked with a separator interposed therebetween. The electrode assembly 160 may also adopt the structure where a positive electrode plate having an elongated strip shape and a negative electrode plate having an elongated strip shape are folded in a bellows shape with a separator interposed therebetween.

That is, provided that the electrode assembly 160 adopts the structure where an end portion of the electrode assembly 160 to be joined to a current collector is formed by stacked electrode plates, the intrusion of a foreign substance such as metal powder into the inside of the electrode assembly 160 from the end portion can be suppressed by forming electrode plate welded portions and current collector joined portions on the end portion (see FIG. 6, for example).

Further, an area of the electrode plate welded portions and an area of the current collector joined portions (areas as viewed in a thickness direction of the electrode assembly 160 (Y axis direction), the same definition being applicable hereinafter) can be changed as desired. For example, at the positive-electrode-side end portion 161 of the electrode assembly 160 shown in FIG. 10, one electrode plate welded portion 161a having an elongated shape extending in a Z axis direction may be formed below the connecting plate portion 192 or below the connecting plate portion 193. That is, the electrode plate welded portion 161a having a relatively large area may be formed on a region of the positive-electrode-side end portion 161 which does not overlap with a positive electrode current collector. With such a configuration, an amount of gap formed between the stacked positive electrode plates 163 can be reduced. As a result, an effect of suppressing the intrusion of a foreign substance into the inside of the electrode assembly 160 brought about by the formation of the electrode plate welded portions 161a can be further enhanced.

In the embodiment, the positive electrode current collector 140 and the positive electrode terminal 200 are connected to each other by caulking the connecting portion 210. However, a technique for connecting the positive electrode current collector 140 and the positive electrode terminal 200 is not limited to caulking, and other techniques such as fastening using bolts and nuts may be adopted. The same goes for a technique for joining the negative electrode current collector 150 and the negative electrode terminal 300 to each other.

The present invention is applicable to an energy storage device such as a lithium ion secondary battery.

What is claimed is:

1. An energy storage device, comprising:
   an electrode assembly in which electrode plates are stacked;
   a current collector connected to an end portion of the electrode assembly;
   a container which accommodates the electrode assembly and the current collector; and
   a spacer which is disposed between the electrode assembly and an inner surface of the container, the spacer including a projecting portion projecting toward the electrode assembly,
   wherein the end portion of the electrode assembly includes:
      an electrode plate welded portion at which the stacked electrode plates are welded to each other in a stacking direction and not joined to the current collector; and
      a current collector joined portion which is joined to the current collector and is arranged adjacently to the electrode plate welded portion in a current collector extending direction that intersects with the stacking direction,
   wherein the electrode assembly includes a separator disposed on an outermost side of the electrode assembly, and further includes a non-coated portion where an active material layer is not formed on the end portion of the electrode assembly, and
   wherein the projecting portion presses the separator toward the non-coated portion such that a gap between the separator and the non-coated portion in the stacking direction is closed.

2. The energy storage device according to claim 1, wherein, in the stacking direction, the projecting portion, the separator, and the non-coated portion are arranged in this order.

3. The energy storage device according to claim 1, wherein the projecting portion is directly in contact with the separator.

4. The energy storage device according to claim 1, wherein the electrode plate welded portion and the current collector joined portion overlap with the current collector as viewed in the stacking direction.

5. The energy storage device according to claim 1, wherein the current collector joined portion comprises a plurality of current collector joined portions, and the electrode plate welded portion is positioned between the current collector joined portions in the current collector extending direction.

6. The energy storage device according to claim 1, wherein the electrode plate welded portion comprises a plurality of electrode plate welded portions, and the current collector joined portion is positioned between the electrode plate welded portions in the current collector extending direction.

7. The energy storage device according to claim 1, wherein the electrode plate welded portion is formed by welding the stacked electrode plates by ultrasonic welding, and
   wherein the end portion of the electrode assembly and the current collector are joined to each other by ultrasonic welding at the current collector joined portion.

8. The energy storage device according to claim 1, wherein the electrode assembly includes a winding-type electrode assembly that includes a pair of oppositely facing flat portions and curved portions connecting the flat portions,
   wherein the electrode plate welded portion is formed in the flat portions such that the stacked electrode plates are welded to each other,
   wherein the current collector joined portion is formed in the flat portions such that the stacked electrode plates are joined to the current collector, and
   wherein the end portion of the electrode assembly further includes non-welded portions formed in the curved portions at which the stacked electrode plates are not welded to each other.

9. The energy storage device according to claim 8, wherein, in the electrode plate welded portion, the stacked electrode plates of the pair of flat portions are collectively welded to each other, and
   wherein in the current collector joined portion, the stacked electrode plates of the pair of flat portions are collectively welded to the current collector.

10. A method of manufacturing an energy storage device, the method comprising:
    forming an electrode plate welded portion on an end portion of an electrode assembly by welding stacked electrode plates in a stacking direction;
    forming a current collector joined portion other than the electrode plate welded portion, at which the end portion of the electrode assembly is joined to a current collector,
    wherein the electrode assembly includes:
       a separator disposed on an outermost side of the electrode assembly; and
       a non-coated portion where an active material layer is not formed on the end portion of the electrode assembly;
    wherein the energy storage device further includes:
       a container accommodating the electrode assembly; and
       a spacer disposed between the electrode assembly and an inner surface of the container, the spacer including a projecting portion projecting toward the electrode assembly; and
    wherein the method further comprises pressing the separator, by the projection portion, toward the non-coated portion of the electrode assembly such that a gap between the separator and the non-coated portion of the electrode assembly in the stacking direction is closed.

11. The method of manufacturing the energy storage device according to claim 10, wherein the current collector joined portion is formed after the electrode plate welded portion is formed.

* * * * *